3,187,059
PYRAZOLIDONE ANTIOXIDANTS FOR
CHLOROPRENE
Hubert Charles Bailey, Ealing, London, and George William Godin, Raynes Park, London, England, assignors to The Distillers Company Limited, Edinburgh, Scotland, a British company
No Drawing. Filed May 15, 1962, Ser. No. 194,994
Claims priority, application Great Britain, June 28, 1961, 23,323/61
2 Claims. (Cl. 260—652.5)

The present invention relates to chemical compositions stabilised against deterioration due to oxidation and in particular to such compositions containing chloroprene.

It is known that chloroprene, particularly on storage, deteriorates due to oxidation. It has been found that the use of known phenolic antioxidants to minimize this deterioration results in undesirable effects in the subsequent polymerisation of the chloroprene, e.g. a retardation of the polymerisation rate.

It is an aim of the present invention to provide a composition comprising chloroprene and an antioxidant substance which avoids or reduces any adverse effects on the polymerisation properties of the chloroprene.

Accordingly the present invention is a composition comprising chloroprene and as an antioxidant, 1-phenyl-3-pyrazolidone and/or a derivative or derivatives thereof.

Suitable derivatives of 1-phenyl-3-pyrazolidone which may be used in the composition of the invention are for example 1-phenyl-5-methyl-3-pyrazolidone, 1-phenyl-4-methyl-3-pyrazolidone, 1,5-diphenyl-3-pyrazolidone, 1-phenyl-4,4-dimethyl-3-pyrazolidone, and 1-tolyl-3-pyrazolidone. The pyrazolidone antioxidants of the present invention may be used singly or in any desired admixture with one another. The use of 1-phenyl-3-pyrazolidone is preferred.

The pyrazolidone antioxidants of the present invention may be incorporated into the composition within a moderately wide range of proportions. Generally such proportions range from 10 to 2,000 parts by weight per million of the composition.

The following example illustrates the effectiveness of the pyrazolidone antioxidants in increasing the resistance of chloroprene to oxidative deterioration.

EXAMPLE 1

Equal samples of chloroprene containing known amounts of pyrazolidone antioxidants were shaken under conditions of constant pressure and temperature in an atmosphere of an oxygen-containing gas. Oxygen adsorption by the chloroprene was observed by the movement of mercury in a manometer connected to the system. The induction period between commencement of shaking of the sample until the start of rapid take up of oxygen by the chloroprene was noted. The results obtained are shown in the table below.

Table

| Antioxidant | Amount in parts per million | Induction period in minutes |
|---|---|---|
| 1-phenyl-3-pyrazolidone | 10 | 130 |
| Do | 50 | 380 |
| 1-phenyl-4-methyl-3-pyrazolidone | 10 | 90 |
| Do | 50 | 280 |

In comparison treatment of chloroprene under identical conditions to the above but in the absence of pyrazolidone antioxidants resulted in an immediate up take of oxygen i.e. no induction period was observed.

The following example illustrates that the use of an antioxidant substance in accordance with the invention avoids or reduces any adverse effects on the polymerisation of the chloroprene.

EXAMPLE 2

100 parts of chloroprene, containing 200 parts per million of 1-phenyl-3-pyrazolidone and 150 parts of water were emulsified in the presence of a resin soap. Ammonium persulphate and dodecyl mercaptan were added and the mixture heated, with stirring at 40° C. Polymerisation commensed immediately and after 1¾ hours 70% of the chloroprene had polymerised.

We claim:
1. A composition comprising chloroprene and 10 to 2,000 parts by weight of a 1-phenyl-3-pyrazolidone antioxidant per million parts of composition.
2. A composition according to claim 1 in which the antioxidant is at least one of the compounds selected from the group consisting of 1-phenyl-3-pyrazolidone, 1-phenyl-5-methyl-3-pyrazolidone, 1-phenyl-4-methyl-3-pyrazolidone, 1,5-diphenyl-3-pyrazolidone, 1-phenyl-4,4-dimethyl-3-pyrazolidone, and 1-tolyl-3-pyrazolidone.

References Cited by the Examiner
UNITED STATES PATENTS
2,289,367  7/42  Kendall _____ 260—310
2,801,254  7/57  Lappin et al. _____ 260—310
2,965,604  12/60 Heinz et al. _____ 260—92.3

FOREIGN PATENTS
871,196  6/61  Great Britain.

JOSEPH L. SCHOFER, *Primary Examiner.*